US012617897B2

(12) United States Patent
Chen et al.

(10) Patent No.: US 12,617,897 B2
(45) Date of Patent: May 5, 2026

(54) METHOD FOR PREPARING MULTI-COMPONENT POLYMERS THROUGH POST-POLYMERIZATION MODIFICATION

(71) Applicants: JIANGSU ZHONGLI GROUP CO., LTD., Suzhou (CN); DALIAN UNIVERSITY OF TECHNOLOGY, Dalian (CN)

(72) Inventors: Xinxiang Chen, Suzhou (CN); Nan Zheng, Suzhou (CN); Jianyu Sun, Suzhou (CN); Junnan He, Suzhou (CN); Rui Zhang, Suzhou (CN); Wangze Song, Suzhou (CN); Junqiao Yan, Suzhou (CN); Weixing Wang, Suzhou (CN); Feng Hou, Suzhou (CN)

(73) Assignees: JIANGSU ZHONGLI GROUP CO., LTD., Suzhou (CN); DALIAN UNIVERSITY OF TECHNOLOGY, Dalian (CN)

( * ) Notice: Subject to any disclaimer, the term of this patent is extended or adjusted under 35 U.S.C. 154(b) by 525 days.

(21) Appl. No.: 18/032,337

(22) PCT Filed: Nov. 11, 2021

(86) PCT No.: PCT/CN2021/130037

§ 371 (c)(1),
(2) Date: Apr. 17, 2023

(87) PCT Pub. No.: WO2022/257353

PCT Pub. Date: Dec. 15, 2022

(65) Prior Publication Data

US 2023/0391954 A1 Dec. 7, 2023

(30) Foreign Application Priority Data

Jun. 8, 2021 (CN) ........................ 202110634013.4

(51) Int. Cl.
*C08G 73/00* (2006.01)

(52) U.S. Cl.
CPC .................................. *C08G 73/00* (2013.01)

(58) Field of Classification Search
CPC ..................................................... C08G 73/00
See application file for complete search history.

(56) References Cited

FOREIGN PATENT DOCUMENTS

| | | |
|---|---|---|
| CN | 113248702 A | 8/2021 |
| JP | 2009215247 A | 9/2009 |
| KR | 100746343 B1 | 8/2007 |

OTHER PUBLICATIONS

Junnan He et al., "Cu-Catalyzed four-component polymerization of alkynes, sulfonyl azides, nucleophiles and electrophiles" Polym. Chem., 2021, 12, 4347-4358 (Jul. 7, 2021).

(Continued)

*Primary Examiner* — Shane Fang
(74) *Attorney, Agent, or Firm* — SZDC Law PC

(57) ABSTRACT

A method for preparing multi-component polymers through post-polymerization modification, used to functionalize polysulfonyl imidate polymer including a dispersing polymer reactant, an electrophilic substitution reagent and a catalyst in an organic dispersant; adding acid-binding agent to react at room temperature for 4-48 h; obtaining the precipitate when the reaction finished; washing and drying the precipitate to get the functionalized multi-component polymers.

7 Claims, 7 Drawing Sheets

(56) References Cited

OTHER PUBLICATIONS

Junnan He et al., "Multicomponent Polymerization toward Biodegradable Polymers with Diverse Responsiveness in Tumor Microenvironments" Polym. Chem., 2019, 11, 1198-1210 (Dec. 23, 2019).
Hyunseok Kim et al., "Preparation of a Library of Poly(N-sulfonylimidates) by Cu-Catalyzed Multicomponent Polymerization" ACS Macro Lett. 2014, 3, 791-794 (Jul. 30, 2014).
Ralph Husmann et al., "Copper-catalyzed one-pot synthesis of α-functionalized imidates" Chemical Communications, 2010, 46, 5494-5496 (Jun. 24, 2010).

METHOD FOR PREPARING MULTI-COMPONENT POLYMERS THROUGH POST-POLYMERIZATION MODIFICATION

CROSS-REFERENCE TO RELATED APPLICATIONS

This application is the National Stage Application of PCT/CN2021/130037, filed on Nov. 11, 2021, which claims the priority of the Chinese application No. 2021106340134, filed on Jun. 8, 2021, the content of which is incorporated into this specification by reference.

FIELD OF THE INVENTION

The present disclosure relates to a method for preparing functionalized polymers, and specifically to a method for preparing functionalized polymers by introducing electrophilic substitution groups through post-polymerization modifications.

BACKGROUND OF THE INVENTION

Functionalized polymers have been applied in various aspects of our daily lives, including organic electronics, chemical/biosensing, medical diagnostics, and bioimaging. The development of these polymers, which contain specific functional groups or structures that exhibit unique properties or respond to changes in the environment, has expanded the scope and applications of polymers. Functionalized polymers represent a significant advancement in polymer research.

At present, the functionalization of polymers is mainly achieved in two ways, one is to directly polymerize monomers to form functionalized polymers, and the other is to introduce functionalized groups through post-modification of polymers. For the first approach, the monomer electronic and site blocking effects during the polymerization process can severely limit the growth of polymer chains, resulting in low polymerization reaction efficiency and small polymer molecular weight, which is not suitable for producing functional polymers with complex structures. For the second method, as early as 1840, Hancok and Ludersdorf has been applied to sulfur post-treatment of natural rubber to obtain high-performance elastic materials, after decades of development, from the preparation of simple functionalized polymers to the ability to synthesize functionalized polymers with complex structures, pouring many generations of technical research and development efforts, and for the synthesis of complex. For the synthesis of complex structured polymers, how to achieve the maximum efficiency of the polymerization process, the controlled structure of polymer products, and the green polymerization process and products are still the difficulties and focus of the continuous improvement of the synthesis method. For example, poly(sulfonyl imidate), its electrophilic substituted derivatives can be used as carriers for hydrophobic drug group loading and are important intermediates for pharmaceutical synthesis, but in the current technology, these poly(sulfonyl imidate) polymers are considered to have low polymerization activity and cannot be functionalized by post-modification (electrophilic substitution) of their α-positions.

SUMMARY OF THE INVENTION

To overcome the shortcomings of prior art methods, it is therefore an object of this disclosure to provide a method for preparing multiple-component polymers through post-polymerization modification. Specifically, this method is used to functionalize polysulfonyl imidate polymer in a one-pot synthesis for functional polymers.

To achieve the above purpose, the present disclosure provides the following technical solutions:

A method for preparing multi-component polymers through post-polymerization modification, used to functionalize polysulfonyl imidate polymer, includes:

- dispersing a polymer reactant, an electrophilic substitution reagent and a catalyst in an organic dispersant;
- adding an acid-binding agent to react at room temperature for 4-48 h;
- obtaining the precipitate when the reaction is completed;
- washing and drying the obtained precipitate to get the functionalized multi-component polymers;
- the polymer reactant includes a structure as shown below:

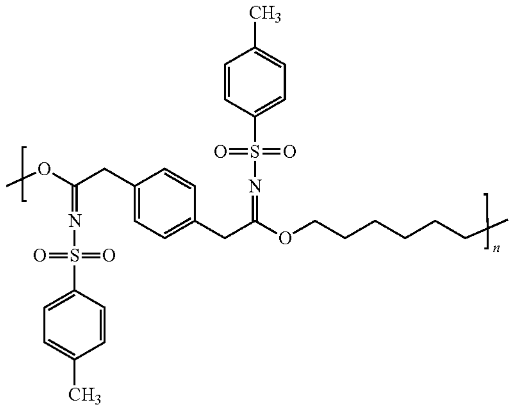

- wherein n is an integer from 1 to 50;
- the electrophilic substitution reagent is selected from the group consisting of para-substituent of the aromatic ring of trans-nitracrine with a formula structure as shown below,

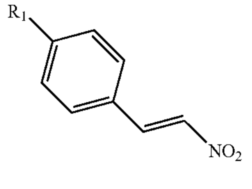

- or esters with glyoxylate group with a formula structure as shown below,

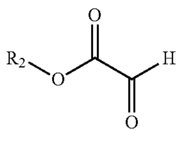

- or Baylis-Hillman addition derivatives with a formula structure as shown below,

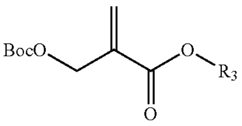

wherein $R_1$, $R_2$ and $R_3$ are electron-donating groups or electron-withdrawing groups;

a molar ratio of the polymer reactant to the electrophilic reagent is 1:1-2.

Furthermore, the multi-component polymers further include a structure selected from the group consisting of:

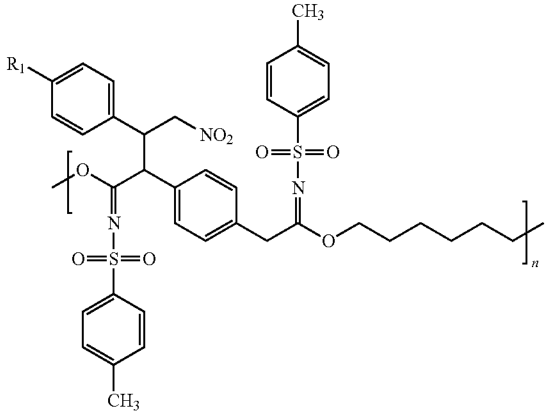

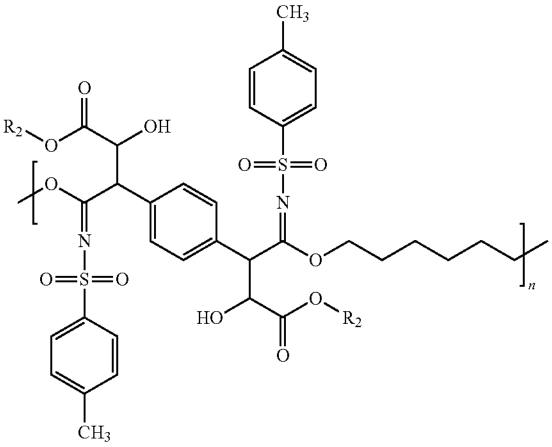

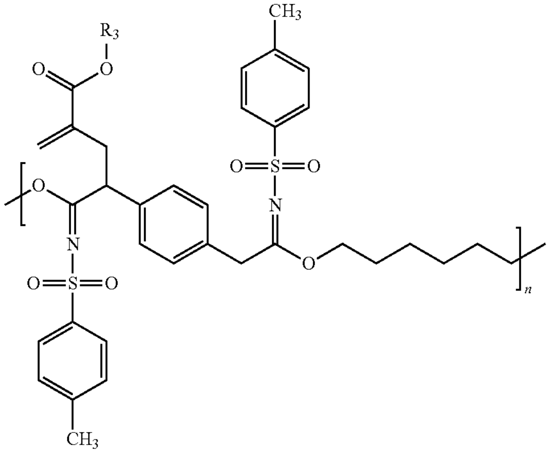

wherein the multi-component polymers have a molecular weight of 8000-31000 g/moL.

Furthermore, the electrophilic substitution reagent is selected from the group consisting of:

1

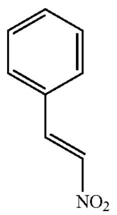

2

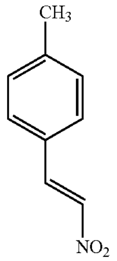

3

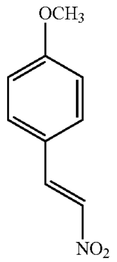

4

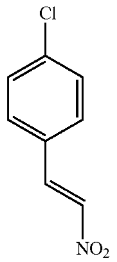

5

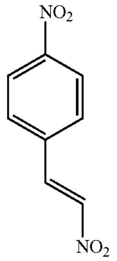

6

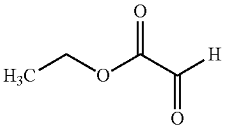

-continued

7

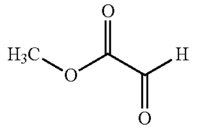

8

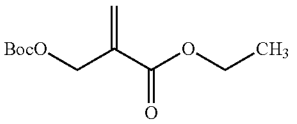

9

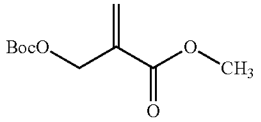

Moreover, the organic dispersant is tetrahydrofuran or N,N'-dimethylformamide.

Furthermore, the monomer concentration of the electrophilic reagent in the organic dispersant is 0.1 M-0.4 M.

In addition, the catalyst includes cuprous bromide.

Additionally, the acid binding agent includes triethylamine.

This disclosure also provided a detailed description of further functionalizing the multi-component polymer based on the method hereinabove, including:

dispersing the multi-component polymer with the formula structure as shown below and the acid binding agent in the organic dispersant;

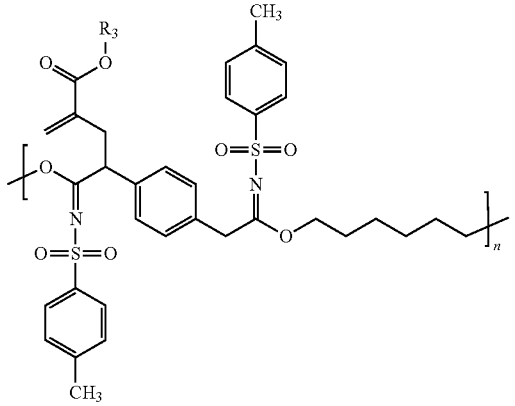

adding electrophilic addition reagent and reacting at room temperature for 4 h;

obtaining the precipitate when the reaction is completed;

drying and washing the precipitate to obtain the further functionalized polymers with the formula structure as shown below,

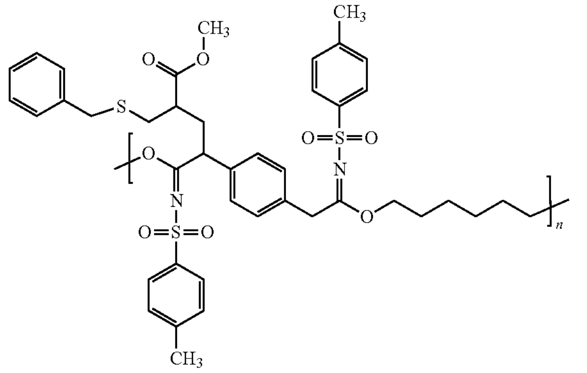

the acid binding agent is triethylamine, the organic dispersant is tetrahydrofuran or N,N'-dimethylformamide, the electrophilic addition reagent is benzyl mercaptan.

The present invention offers numerous benefits, including:

The present disclosure involves a low polymerization temperature, allowing for the reaction to occur at room temperature. Additionally, the conversion rate is high, and the applicable electrophilic substitution monomer reagents have a wide selection.

Besides that, this disclosure enables the functionalization of complex polymers using a one-pot method, which reduces the reaction steps, improves the utilization rate of raw materials, promotes the efficient use of resources, minimizes the generation of by-products, and eliminates the need for time-consuming purification operations, ultimately reducing production costs.

According to conventional synthetic chemistry, polysulfonyl imidate polymers exhibit low reactivity and are generally considered difficult to modify after functionalization via electrophilic substitution at their α-position. However, this disclosure not only provides a method to achieve the post-α-position modification of such polymers, but also provides a reaction design to further functionalize side chains by addition with other electrophilic reagents in the same reaction system, which can be used to prepare complex polymers and improve overall reaction efficiency.

The above description provides an overview of the technical solution presented in this disclosure. To facilitating a clearer understanding of the underlying technical means and implement in accordance with the contents of the specification, the exemplary embodiments of this disclosure and with the accompanying drawings will be described more in detail hereinafter.

DETAILED DESCRIPTION OF THE SPECIFIC EMBODIMENTS

Figure 1:
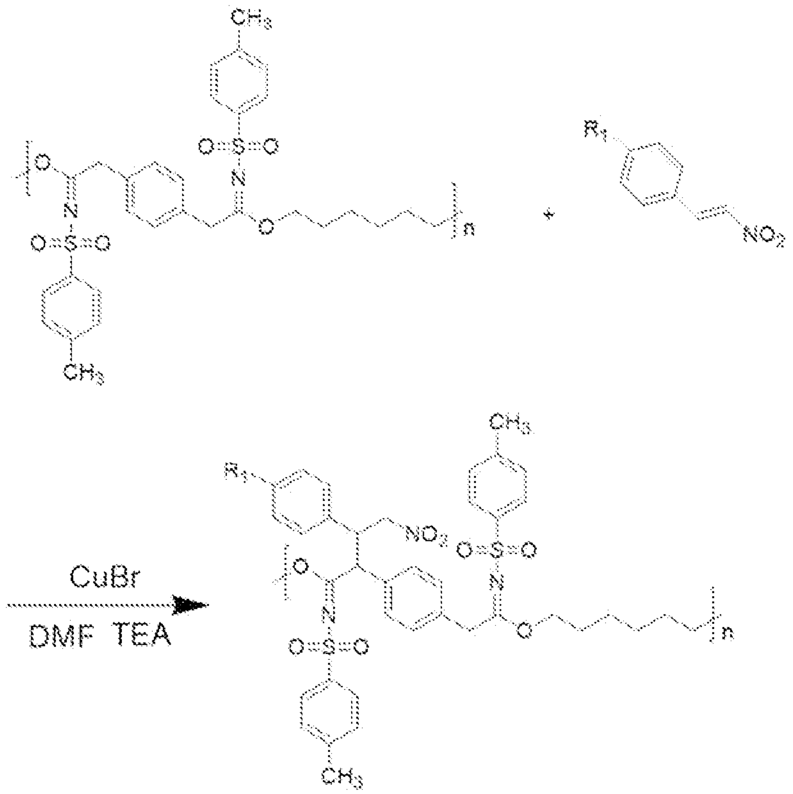
FIG. 1 shows a schematic diagram of the process for preparing the functionalized polymer in Embodiment 1 of this disclosure.

Referring to the drawings, to the following detailed description, detailed information about this disclosure is provided including the description of the specific embodiments. The detailed description serves to explain the principles of this disclosure, and this disclosure is not limited to the particular forms disclosed. This disclosure covers all modifications, equivalents, and alternatives falling within the spirit and scope of the disclosure as defined by the claim.

All chemical reagents and solvents are purchased from Aladdin Chemical Reagent Co. The solvent specifications are all analytical purity, and the reagent purity is 99%.

The polysulfonyl imidate polymer applied in this disclosure includes a formula as shown below, wherein n is an integer from 1 to 50. Such polymer is synthesized through three monomers, sulfonyl azide, bis-alkyne and bis-hydroxy compound, by monovalent copper-catalyzed polymerization at room temperature. The synthesis process can be found in the publication "Multicomponent polymerization toward biodegradable polymers with diverse responsiveness in tumor microenvironments," Polymer Chemistry, 2020, 11(6): 1198-1210.

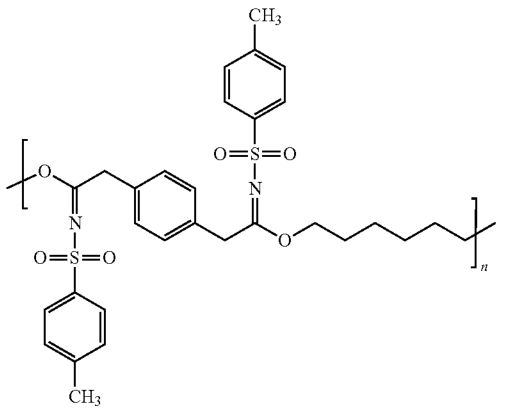

Nuclear magnetic resonance hydrogen spectroscopy ($^1$H-NMR) was tested by Bruker AV 500 NMR instrument from Bruker, Germany.

Embodiment 1

Figure 4:
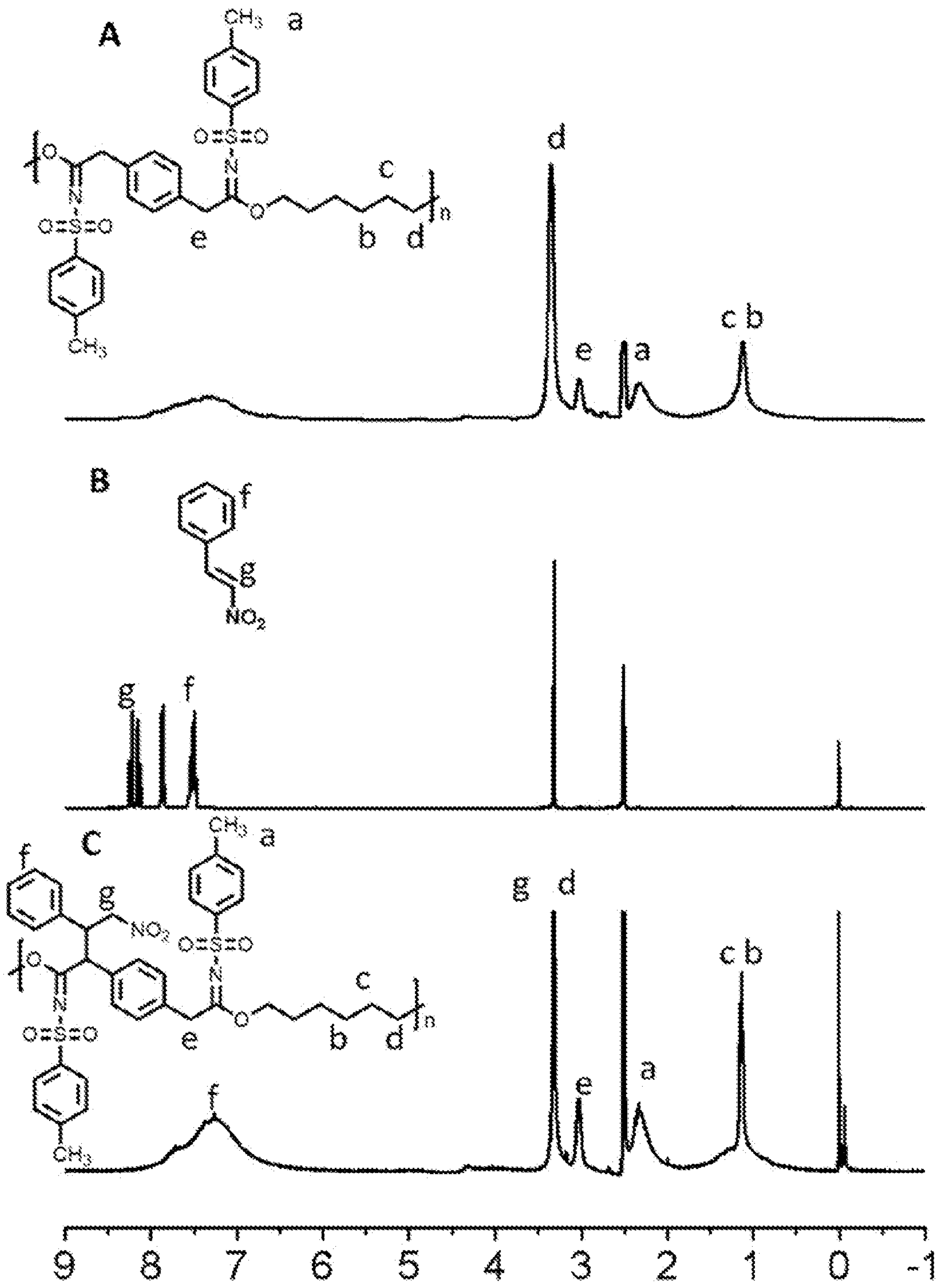
FIG. 4 shows the nuclear magnetogram of the functionalized polymer P1 prepared in Embodiment 1 of this disclosure.

The polysulfonyl imidate polymer (0.2 mmol, 116.2 mg), CuBr (0.04 mmol, 5.6 mg) and trans-nitrostyrene 1 (0.2 mmol, 29.8 mg) were dissolved in 1 mL of anhydrous N,N'-dimethylformamide solvent; then triethylamine (1 mmol, 140 μL) was slowly added to the reaction system and the reaction was carried out at room temperature for 8-48 h with magnetic stirring. After the reaction finished, the product was purified by sedimentation with methanol and dried under vacuum at room temperature to obtain polymer P1 with the structural formula as shown below. Referring to FIG. 4, the hydrogen on the polymer was characterized by 1H NMR, wherein the NMR spectra clearly show that each hydrogen atom on the polymer can be distinguished and analyzed individually. It indicates that the functionalized polymer has been successfully prepared.

P1

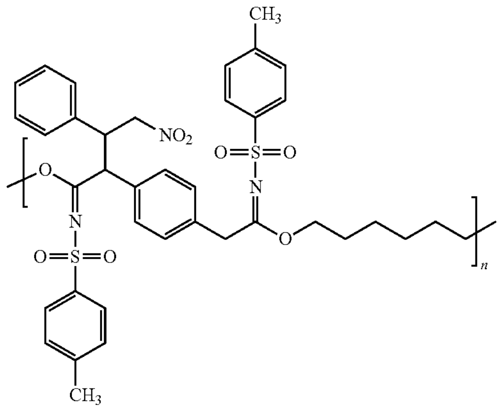

Other trans-nitrostyrene derivatives including but not limiting the compounds represented by structural formulas 2-5 below, could also be applied in the hereinabove reaction. See FIG. 1 for the reaction equation.

1

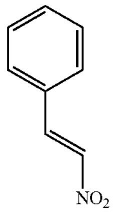

2

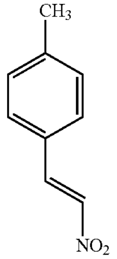

3

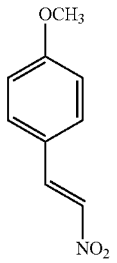

-continued

4

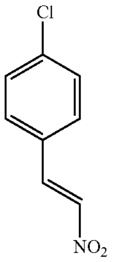

5

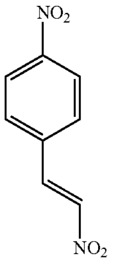

Embodiment 2

The polysulfonyl imidate polymer (0.2 mmol, 116.2 mg), CuBr (0.04 mmol, 5.6 mg) and ethyl glyoxylate as shown in structural formula 6 (0.2 mmol, 29.8 mg) were dissolved in 1 mL of anhydrous N,N'-dimethylformamide solvent; then triethylamine (1 mmol, 140 μL) was slowly added to the reaction system and the reaction was carried out at room temperature with magnetic stirring for 8-48 h. After the reaction finished, the product was purified by sedimentation with methanol and dried under vacuum at room temperature to obtain polymer P2 with the structural formula as shown below.

P2

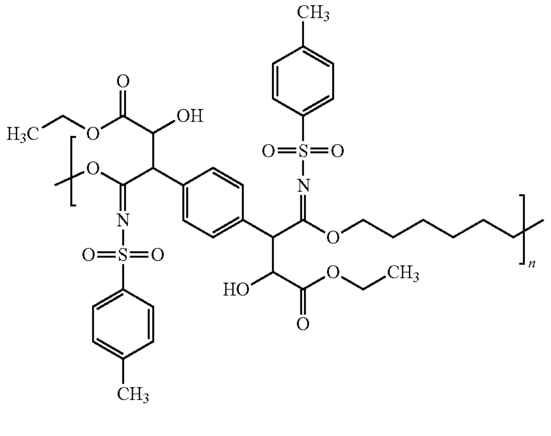

Figure 5:
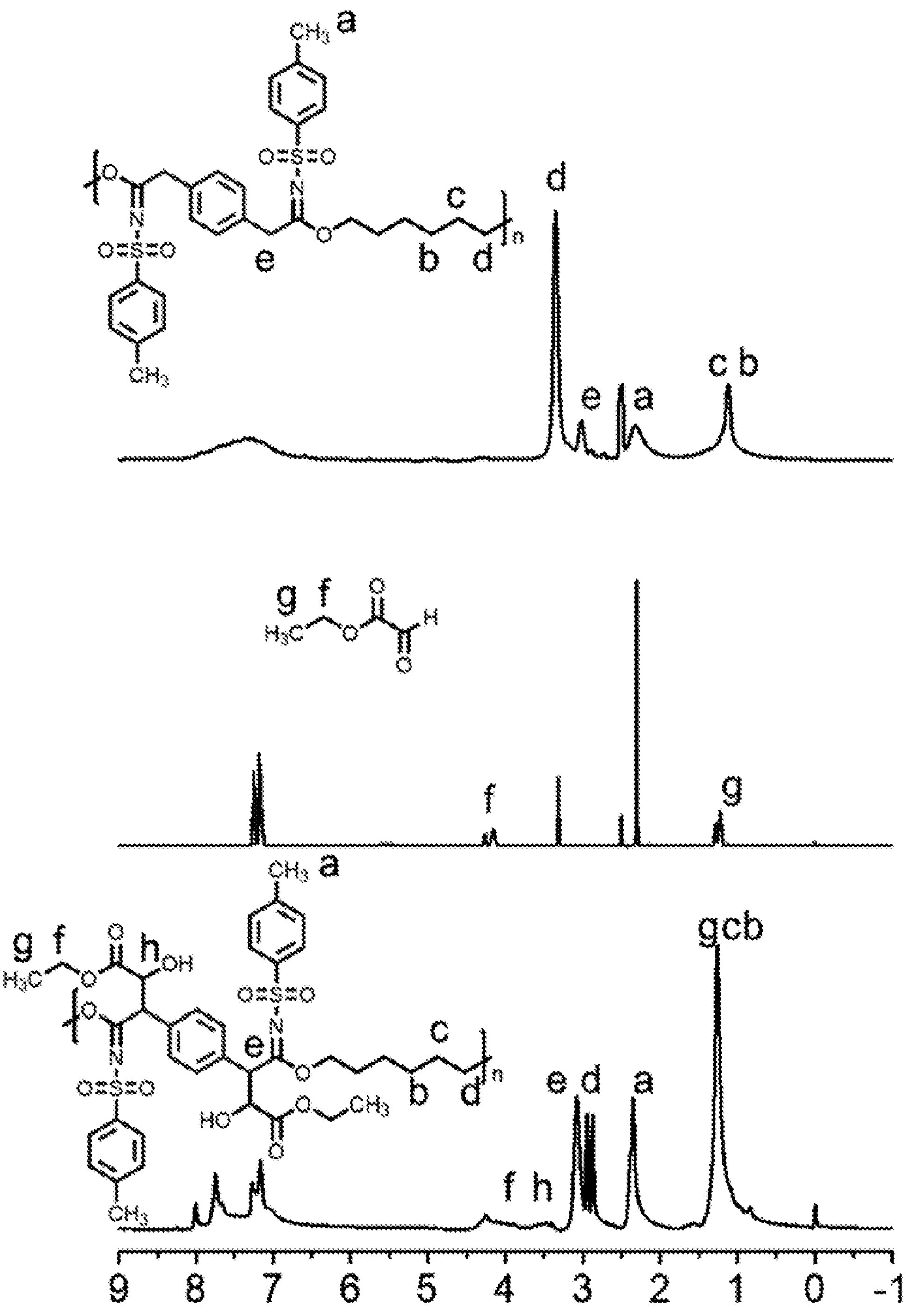
FIG. 5 shows the nuclear magnetogram of the functionalized polymer P2 prepared in Embodiment 2 of this disclosure.

When the polysulfonyl imidate polymer reacts with ethyl glyoxylate 6 in a 1:2 reaction molar ratio, a bimolecular substitution reaction occurs. As shown in FIG. 5, this bimolecular substitution product is characterized by 1H NMR, wherein the hydrogens in the polymer match their respective attributions on the NMR spectrum, indicating that the functionalized polymer has been successfully prepared.

Figure 2:
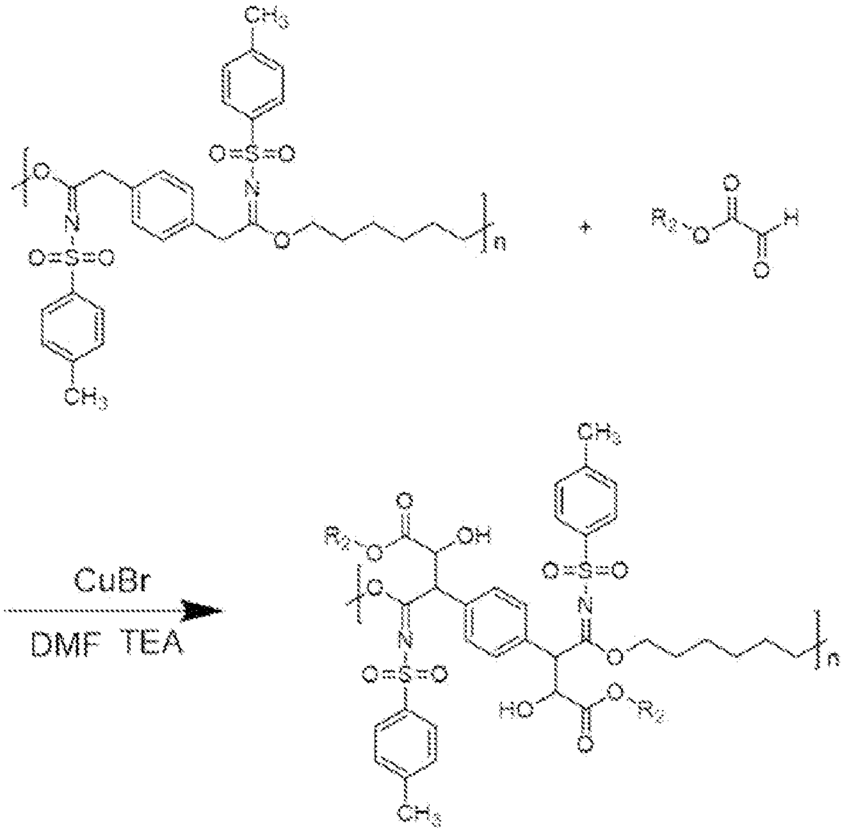
FIG. 2 shows a schematic diagram of the process for preparing the functionalized polymer in Embodiment 2 of this disclosure.

As used herein, other esters including glyoxylate groups, including but not limited to methyl glyoxylate (for example, the structural formula 7 as shown below), could also be appropriate for the hereinabove reaction. See FIG. 2 for the reaction equation.

6

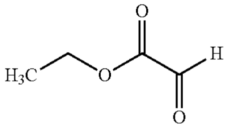

7

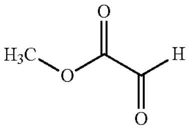

Embodiment 3

Figure 6:
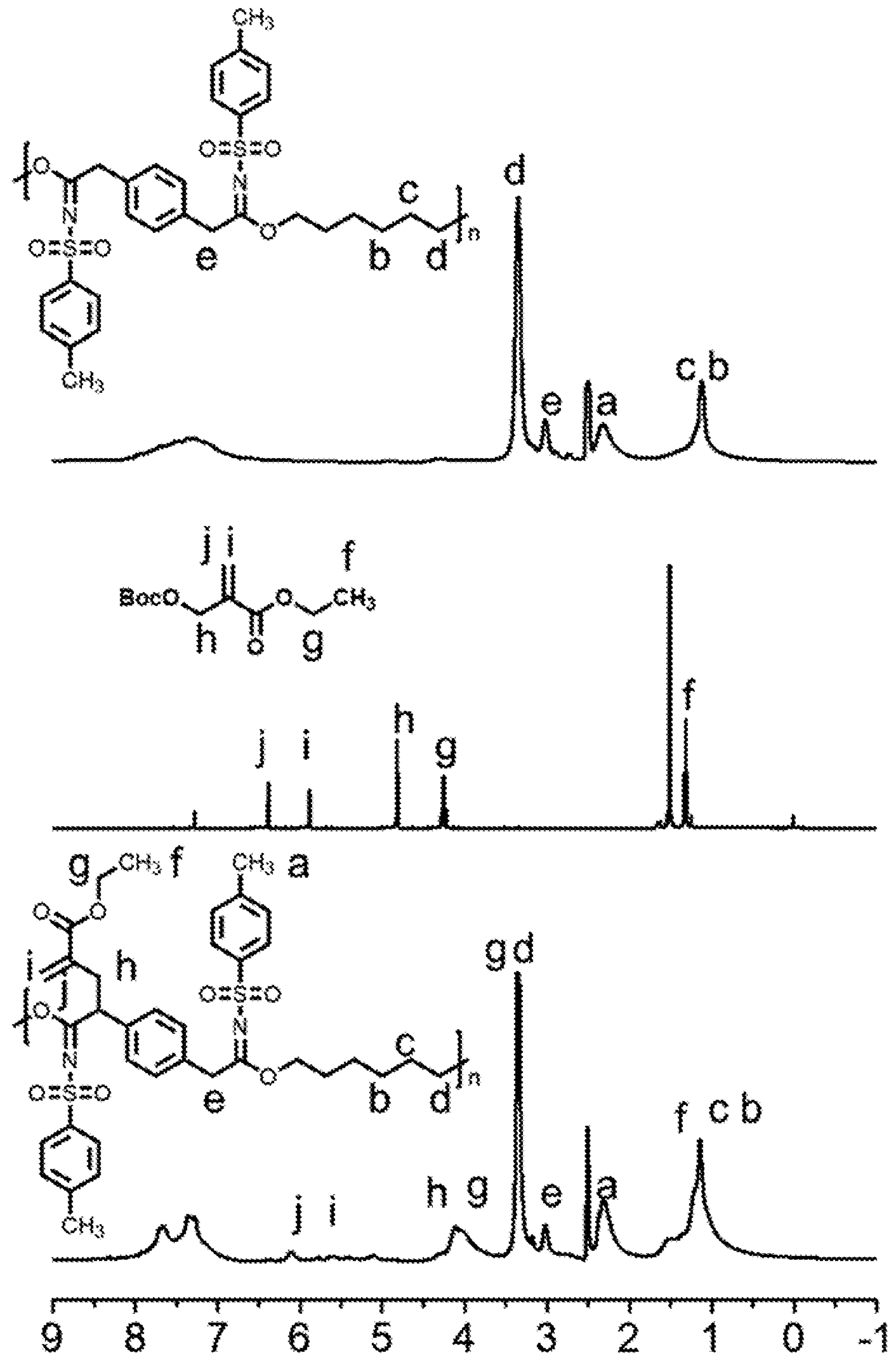
FIG. 6 shows the nuclear magnetogram of the functionalized polymer P3 prepared in Embodiment 3 of this disclosure.

The polysulfonyl imidate polymer (0.2 mmol, 116.2 mg), CuBr (0.04 mmol, 5.6 mg) and Baylis-Hillman addition derivative as shown in structural formula 8 (0.2 mmol, 29.8 mg) were dissolved in 1 mL of anhydrous N,N'-dimethylformamide solvent; then triethylamine (1 mmol, 140 μL) was slowly added to the reaction system and the reaction was carried out at room temperature with magnetic stirring for 8-48 h. After the reaction, the product was purified by sedimentation with methanol and dried under vacuum at room temperature to obtain the polymer P3 with the structural formula as shown below. As shown in FIG. 6, this product is characterized by 1H NMR, wherein the hydrogens in the polymer match their respective attributions on the NMR spectrum, indicating that the functionalized polymer has been successfully prepared.

P3

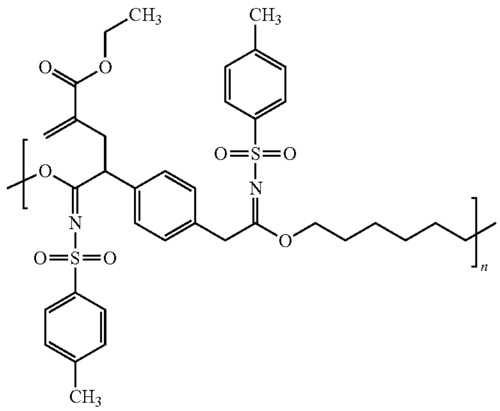

Figure 3:
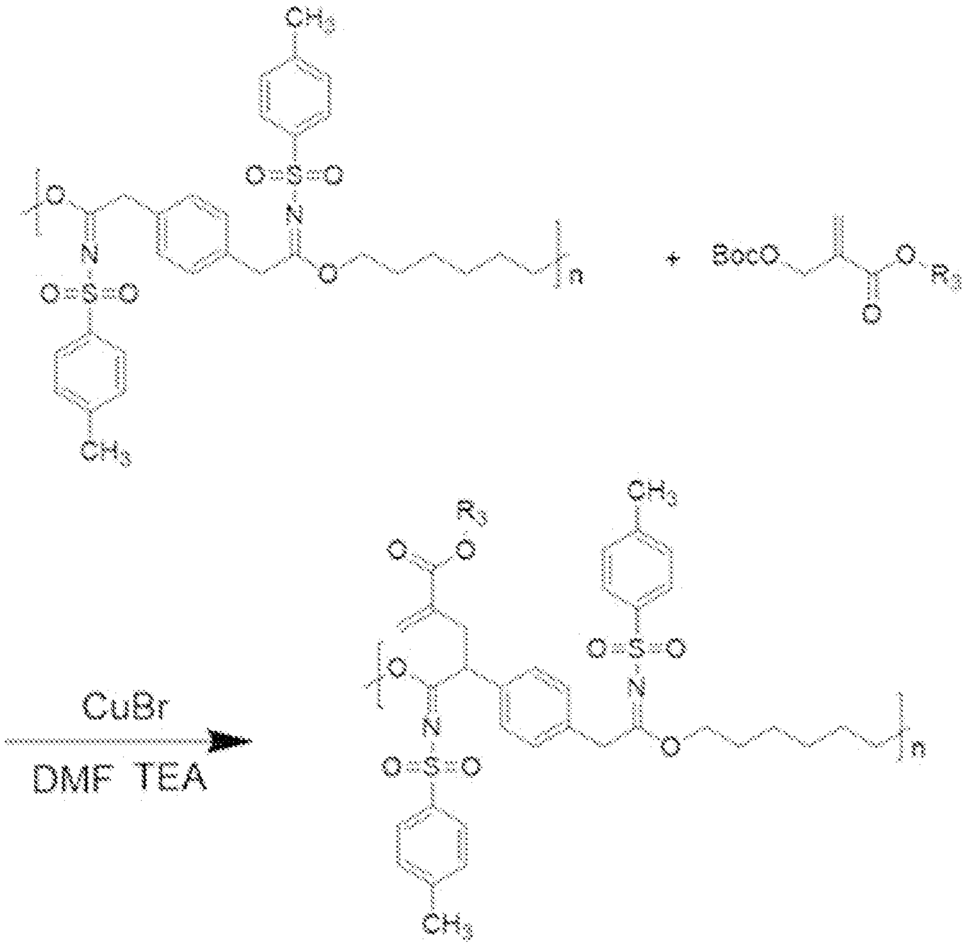
FIG. 3 shows a schematic diagram of the process for preparing the functionalized polymer in Embodiment 3 of this disclosure.

As used herein, other Baylis-Hillman addition including but not limiting to methyl glyoxylate, (for example, the structural formula 9 as shown below) could also be appropriate for the hereinabove reaction. See FIG. 3 for the reaction equation.

8

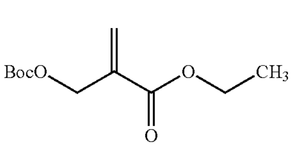

9

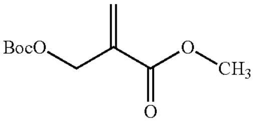

In hereinabove embodiments 1, 2, and 3, the amount of catalyst, cuprous bromide, could vary between 0.01 M and 0.1 M, while the amount of acid binding agent, triethylamine, could range from 0.05 M to 1 M. Moreover, the molecular weight of the synthesized functionalized polymer falls between 8000 and 31000 g/mol.

Embodiment 4

Figure 7:
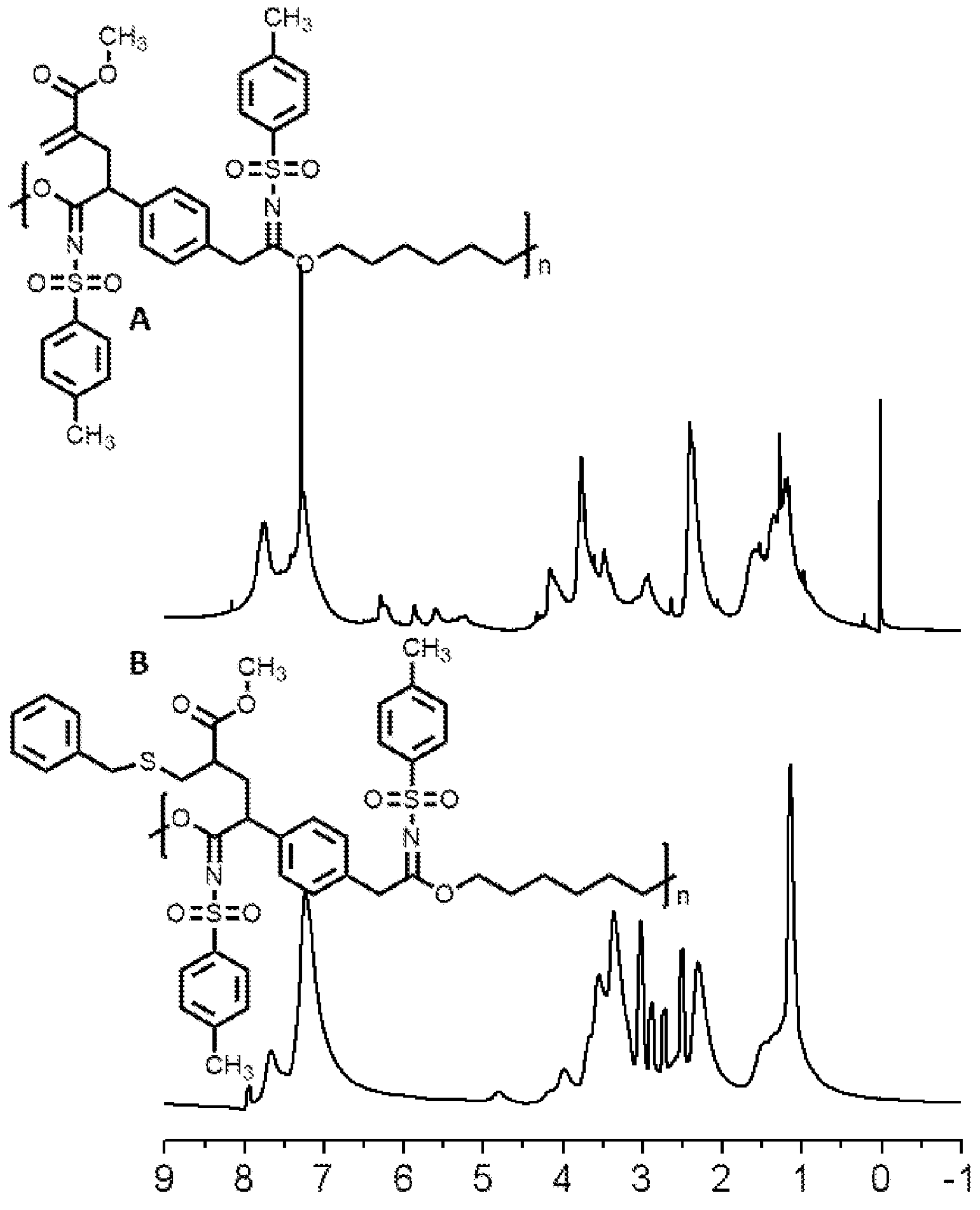
FIG. 7 shows the nuclear magnetogram of the functionalized polymer P4 prepared in Embodiment 4 of this disclosure.

Polymer P3 (40.5 mg) and triethylamine (0.03 mmol, 5 μL) were dissolved in 1 mL of anhydrous N,N'-dimethylformamide solvent, and then benzyl mercaptan (0.18 mmol, 23 mg) was added slowly dropwise and stirred at room temperature for 4 h. After the reaction, the reaction solution was added to a large amount of methanol, the crude product was washed three times with methanol, the purified product was collected by centrifugation, and finally the polymer was dried in vacuum to obtain polymer P4 whose structural formula is shown below. As shown in FIG. 7, this product is characterized by 1H NMR, wherein the hydrogens in the polymer match their respective attributions on the NMR spectrum, indicating that the functionalized polymer has been successfully prepared.

P4

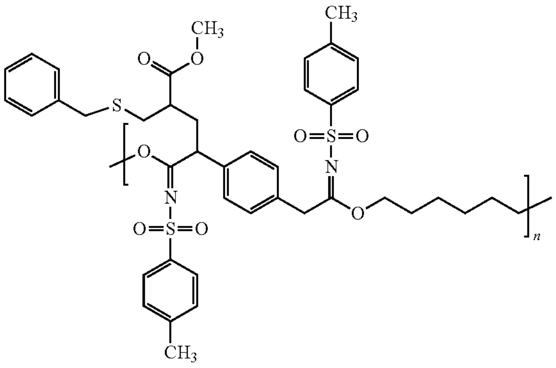

The present disclosure involves a low polymerization temperature, allowing for the reaction to occur at room temperature. Additionally, the conversion rate is high, and the applicable electrophilic substitution monomer reagents have a wide selection. Besides that, the synthesis cost of the reaction is low due to the widespread availability of common chemical reagents such as catalysts, organic dispersants, acid binding agents, and other reaction reagents. The ease of access to these raw materials contributes to the overall affordability of the synthesis process. Moreover, the polymers functionalized through the present invention can undergo further functionalization via addition reactions with other electrophilic reagents within this reaction system through proper reaction design. This ability allows for the preparation of intricate polymers and enhances reaction efficiency.

The technical features of the embodiments described above can be combinable in any manner. While all possible combinations of the technical features have not been exhaustively described to maintain brevity, any combination of these features that does not contradict their intended use should be considered within the scope of this specification.

In the foregoing specification, this disclosure has been described with reference to specific embodiments thereof. The specification should be regarded in an illustrative rather than a restrictive sense. It will, however, be evident that various modifications and changes can be made thereto without departing from the broader spirit and scope of the disclosure as set forth in the appended claims. Therefore, the scope of this disclosure should be limited on by the appended claims.

What is claimed is:

1. A method for preparing a multi-component polymer through post-polymerization modification, used to functionalize a polysulfonyl imidate polymer, comprising:

dispersing a polymer reactant, an electrophilic substitution reagent and a catalyst in an organic dispersant;

adding an acid-binding agent to react at room temperature for 4-48 h;

obtaining a precipitate when the reaction is completed;

washing and drying the obtained precipitate to get the functionalized multi-component polymers;

wherein the polymer reactant includes a structure as shown below:

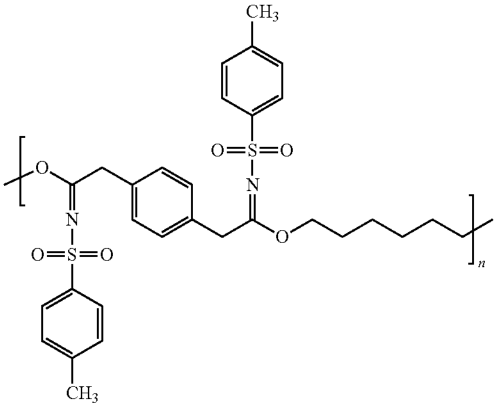

n is an integer from 1 to 50;

the electrophilic substitution reagent is a para-substituted aromatic ring of trans-nitracrine with a formula structure as shown below,

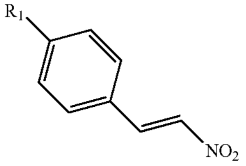

or an ester with glyoxylate group with a formula structure as shown below,

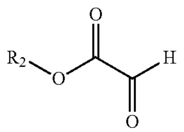

or a Baylis-Hillman addition derivative with a formula structure as shown below,

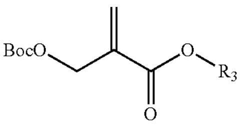

wherein Boc is tert-butyloxycarbonyl;

wherein $R_1$, $R_2$ and $R_3$ are electron-donating groups or electron-withdrawing groups;

a molar ratio of the polymer reactant to the electrophilic reagent is 1:1-2;

the multi-component polymers include a structure selected from the group consisting of:

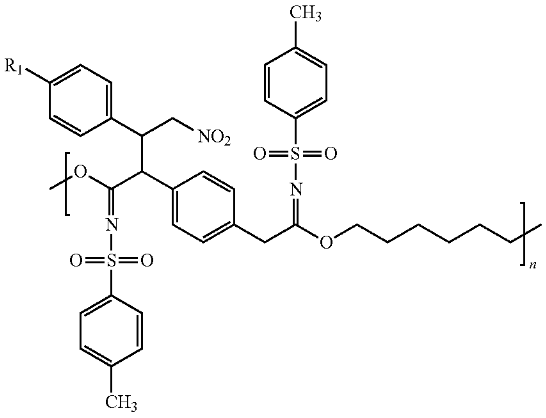

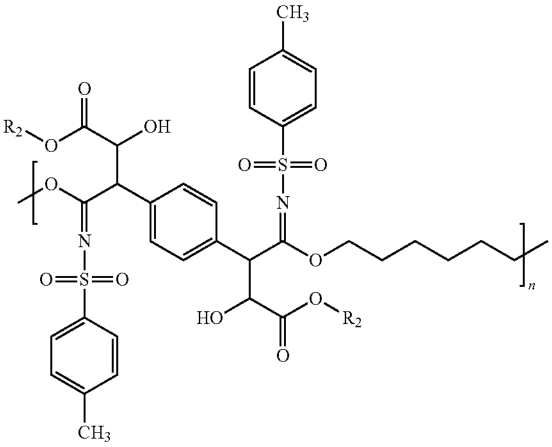

-continued

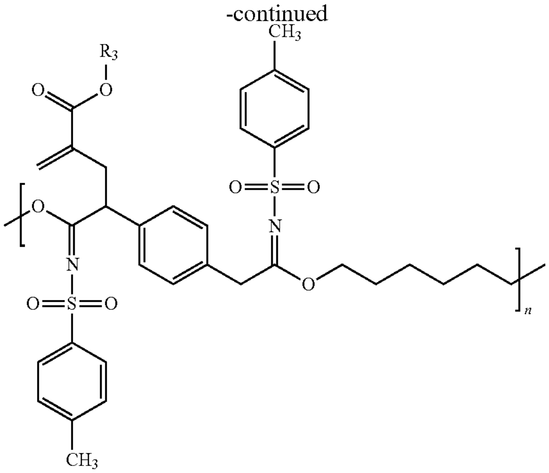

wherein the multi-component polymer has a molecular weight of 8000-31000 g/moL.

2. The method of claim 1, wherein the electrophilic substitution reagent is selected from the group consisting of

1

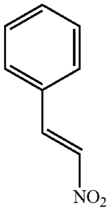

2

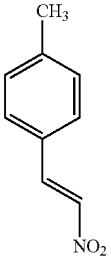

3

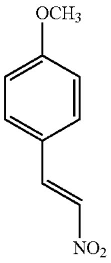

4

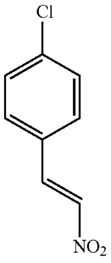

-continued

5

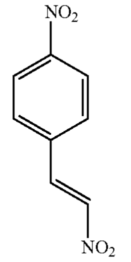

6

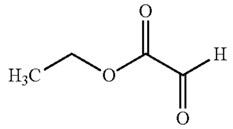

7

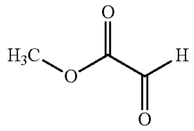

8

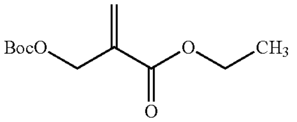

9

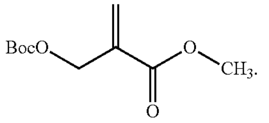

3. The method of claim 1, wherein the organic dispersant is tetrahydrofuran or N,N'-dimethylformamide.

4. The method of claim 1, wherein a concentration of the electrophilic substitution reagent in the organic dispersant is 0.1 M-0.4 M.

5. The method of claim 1, wherein the catalyst comprises copper bromide, an amount of copper bromide ranges from 0.01 M-0.1 M.

6. The method of claim 1, wherein the acid binding agent comprises triethylamine, and the amount of triethylamine ranges from 0.05 M-1 M.

7. A method of further functionalizing the multi-component polymer prepared by the method of claim 1, comprising:

dispersing the multi-component polymers with the formula structure as shown below and the acid binding agent in the organic dispersant;

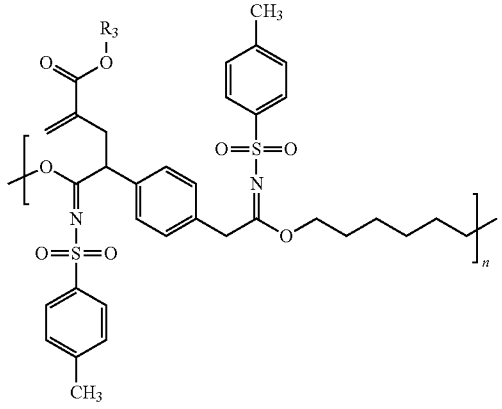

wherein n is an integer from 1 to 50, and $R_3$ is an electron-donating group or electron-withdrawing group;

adding electrophilic addition reagent and reacting at room temperature for 4 h;

obtaining the precipitate when the reaction is completed;

drying and washing the precipitate to obtain the further functionalized polymers with a formula structure as shown below:

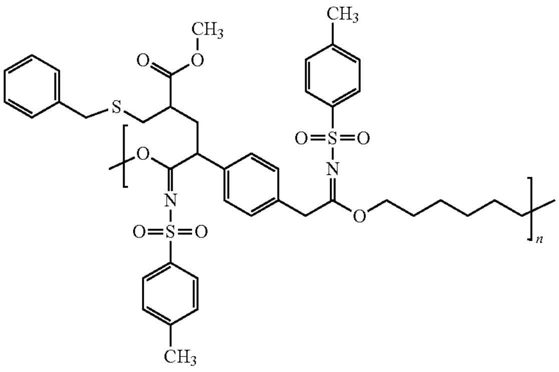

the acid binding agent is triethylamine, the organic dispersant is tetrahydrofuran or N,N'-dimethylformamide, and the electrophilic addition reagent is benzyl mercaptan.

* * * * *